FIG. 4

FIG. 5
MAINTENANCE CIRCUIT

FIG. 6

3,344,241
TROUBLE INDICATING SYSTEM
Joseph Harmon, Yonkers, John M. Repholz, New York, and August J. Sarka, Baldwin, N.Y., assignors to American Telephone and Telegraph Company, New York, N.Y., a corporation of New York
Filed Apr. 20, 1964, Ser. No. 361,082
10 Claims. (Cl. 179—175.2)

This invention relates generally to automatic switching systems, and more particularly to supervisory circuits which control the availability of a group of associated system units as determined by the presence or absence of equipment trouble in such units.

The improvement of automatic telephone switching in recent years has resulted in the development of systems which are characterized by extremely high speed of operation. This characteristic of high speed accounts to a great extent for the economy of such systems since the individual circuit units are quite complex and relatively expensive. However, though advantageous for over-all system purposes, such speed when coupled with the aforesaid complexity of individual circuit units, presents a disadvantage from a maintenance standpoint since equipment troubles are thereby rendered more difficult to localize. This maintenance aspect is of particular significance in modern systems because a single common control circuit in trouble will cause a large number of uncompleted connections within a short period of time based upon the frequent re-use of such circuits. Accordingly, to remedy this situation, supervisory circuits have been developed whose primary function is the detection, recording, and deactivation of operating circuit units which are in trouble.

In a typical supervisory circuit arrangement, an operating circuit is artificially "made busy" immediately upon the manifestation of a trouble in such circuit. An audible or visual alarm is thereupon enabled to alert a repairman to repair the defective unit and restore it to service. A significant disadvantage of such arrangements is that certain equipment troubles are self-correcting or transient and therefore will not manifest themselves to the repairman upon inspection of the equipment. When this occurs, the circuit is returned to service to subsequently provide more positive indications; thus, the immediate removal of such circuits from service is of no practical value.

Accordingly, it is an object of this invention to improve switching system performance by providing an arrangement for removing defective circuit units from service, which arrangement is designed to disregard the occurrence of transient or self-correcting equipment troubles in such units.

It is another object of this invention to provide an arrangement for removing defective circuit units from service, which arrangement is more efficient and economical than that which has been provided in the past.

In order for the aforesaid supervisory circuits to remove troubled units from service, the existence of trouble must first be established. In this regard it is obvious that each component part of a circuit unit cannot be individually monitored for trouble, since to do so would be economically prohibitive. Therefore, arrangements have been provided whereby trouble detection is accomplished in other ways; for example, by enabling the supervisory circuit to "time" the interval required for an operating circuit to complete its function, or by arranging the operating circuit to return signals to the supervisory circuit in a predetermined sequence indicating completion of various phases of an assigned function. However, such trouble detection arrangements are not always accurate. Often, a trouble blockage in a connecting circuit is the source of trouble which prevents the immediate circuit from completing its assigned function. Thus, an external defect causes a false indication to the supervisory circuit resulting in the removal from service of a circuit which is not, in fact, malfunctioning. The external defect therefore remains uncorrected and is eventually the cause of the removal of other circuits in similar fashion.

Accordingly, it is a further object of this invention to provide a supervisory circuit which is operative to automatically change a prior course of procedure when subsequent developments indicate that such change is desirable.

It is another object of this invention to provide a supervisory circuit which is operative to recognize a required change of procedure by a comparatively simple expedient.

These and other objects of the invention are attained in accordance with an exemplary embodiment wherein a telephone system includes a register circuit arranged to receive digital information from a calling line and further arranged to forward this information to a sender. Upon selecting a sender, the register records the sender identity. The sender converts the information received from the register into a form suitable for transmission to other circuits in the system.

When the sender has received the required information from the register, it so informs the register which thereupon enables a timing circuit. This timing circuit is subsequently disabled upon receipt of a signal from an associated trunk circuit. The signal from the trunk is a confirmation that the register and sender functions have been successfully completed and, therefore, the sender and register circuits may release so as to be available for other calls.

However, in the event the trunk signal is not received within the required time interval, the timing circuit operates and causes the register to seize a central maintenance circuit and to inform it of the sender identity. The register thereupon releases and is automatically taken out of service.

The maintenance circuit proceeds to determine if the sender identity had been received previously as the result of a prior connection. If the identity had been received before, a signal is forwarded to the sender thereby enabling means located in the sender which renders the sender unavailable for future service calls. However, if the identity of the sender had not been received previously, the identity information is stored in the maintenance circuit. A subsequent seizure of the maintenance circuit by another register, which again results in the receipt of the same sender identity, automatically causes a signal to be forwarded to the sender which results in the sender being removed from service.

The above procedure continues until a predetermined number of senders have been removed from service. Assuming, for example, this predetermine number to be three; upon completion of the identification of the third sender, the maintenance circuit locks out subsequent requests by registers and sounds a major alarm thereby indicating the existence of an external trouble common to the register and sender circuits.

Therefore, in summary, a maintenance circuit is arranged to take a sender out of service only after a second identification has been received, on the assumption that the initially received identification was based upon a transient or self-correcting trouble. In the event that a predetermined number of senders are taken out of service in this fashion, the taking-out-of-service-function is inhibited upon receipt of a succeeding trouble indication on the further reasoning that a major trouble external to the senders is at fault.

In accordance with one feature of our invention, a maintenance circuit is arranged to remove an operating circuit from service only after a subsequent indication has confirmed a finding of trouble, and to inhibit further action when the number of operating circuits so removed contradicts the aforesaid confirmed findings for each of the removed circuits.

In accordance with another feature of our invention, a maintenance circuit is arranged to record trouble indications regarding a group of operating circuits and to recognize when certain operating circuits are involved in more than one such trouble indication.

The foregoing objects and features, as well as others, of this invention, will be more apparent from a consideration of the subsequent description and the drawing, in which.

It will be noted that FIGS. 3 through 6 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, Volume 74, pages 505–513.

The present invention may advantageously be incorporated in an automatic telephone system wherein common control circuits are employed to control the establishment of calls through a switching network. One such system is the stock quotation system disclosed in the G. Riddell application, Ser. No. 333,000, filed Dec. 24, 1963, in the United States Patent Office. It is to be understood, however, that the present invention is not limited to use in a telephone system of this type but may be utilized in other types of switching systems.

The invention is described herein as being embodied in a telephone system of the type disclosed in the cited Riddell application. It is particularly concerned with apparatus in registers 6 and 15, senders 3, 5, 7 and N, maintenance circuit 16, and major alarm circuit 19 which are represented by the blocks shown with heavy lines in FIG. 2. The other equipment units are neither shown nor described in detail except where necessary for a complete understanding of the invention. The Riddell application may be consulted for a complete understanding of the construction and operation of components not covered in detail herein. For purpose of illustration it is intended that the apparatus shown on FIGS. 1 and 2 which is not enclosed with heavy lines is similar to the corresponding apparatus disclosed in the Riddell application.

*General description*

Figures 1, 7, 8:
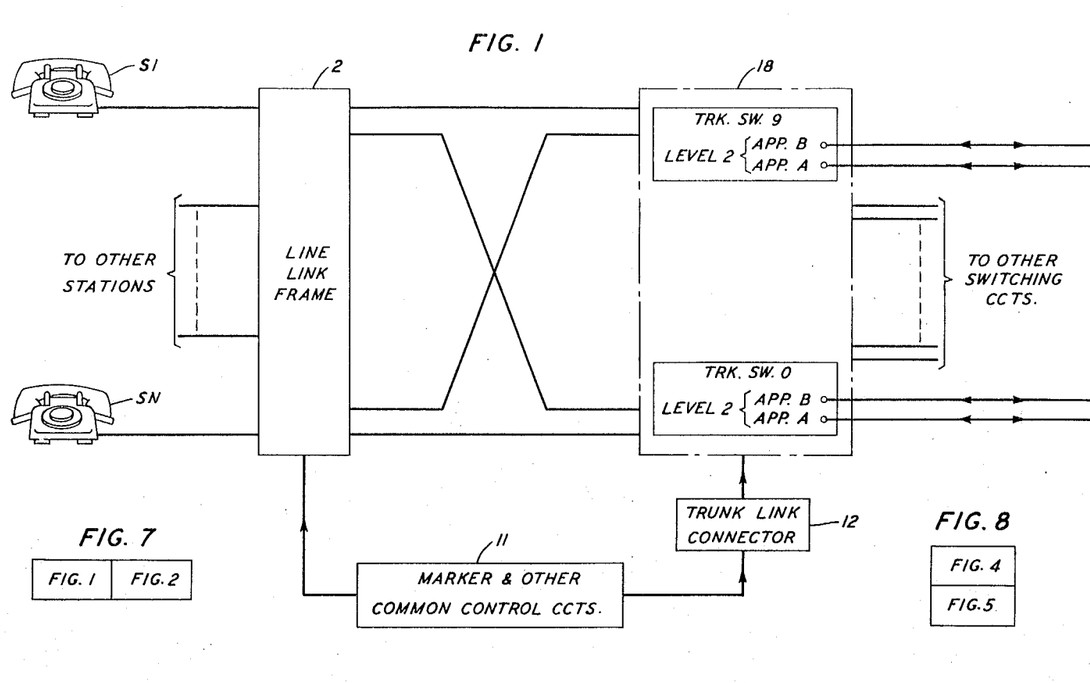
FIGS. 1 and 2 are essentially a block diagram showing the interrelation of the components of the exemplary embodiment.
FIGS. 7 and 8 show the manner in which FIGS. 1 and 2, and FIGS. 4 and 5 should be arranged.

The interrelation and function of the equipment units of the exemplary empodiment will now be described with reference to FIGS. 1 and 2 wherein the interconnection between circuit blocks has been designated by arrows to show the direction of circuit action. We shall assume that a dial tone connection has been established between station S1 and register 6 as set forth in detail in the Riddell application. We shall further assume that register 6 has recorded dialed information from station S1 identifying a requested stock quotation.

Upon receiving the information from station S1, register 6 bids for and seizes sender 3 through sender connector 17. Register 6 thereupon forwards the information received from station S1 to sender 3 and concurrently therewith receives from sender 3 information indicating the identity of the sender.

When sender 3 has received and registered the information from register 6, it returns a signal to the register. This signal advises register 6 that within a predetermined interval, trunk 8 will be activated to complete the connection to station S1 as set forth in the Riddell disclosure. As further described in the Riddell application, upon the enabling of trunk 8, register 6 and sender 3 are released so as to be available for subsequent calls.

If no trouble condition exists at this time, the call will proceed as described in the Riddell application. However, assuming that a trouble condition does exist which prevents sender 3 from effectively completing its function within a predetermined interval, register 6 will time out. Upon so doing, register 6 immediately calls in maintenance circuit 16 and advises it of the identity of sender 3. Register 6 thereupon takes itself out of service. Maintenance circuit 16 searches its memory to determine if the identity information received from register 6 has been received on a prior connection from another register. If this information has been received before, a signal is sent to sender 3 causing sender 3 to immediately remove itself from service in a manner which will be more apparent from that which is contained hereinafter. However, if the sender identity information is received for the first time by maintenance circuit 16, the information is merely stored to await further developments and no further action is taken by maintenance circuit 16 at this time.

We shall assume that traffic progresses through the system as described in detail in the Riddell application and, as a result of this activity senders 5 and 7 are successively removed from service as hereinbefore described for sender 3. Upon taking sender 7 out of service, maintenance circuit 16 automatically locks out further seizure by any register and enables major alarm circuit 19.

Summarizing at this point, during an interval of time in a single business day, senders 3, 5 and 7 have been removed from service based upon a determination that each has been the source of more than one trouble indication, thus obviating the objection that the initial trouble indication may be false, transient, or self-correcting. The removal of the third sender in this fashion leads to the further determination that though the trouble in fact exists, it is a manifestation of trouble external and common to the senders. Accordingly, the enabling of major alarm circuit 19 advises the repair personnel of this conclusion.

Figure 2:
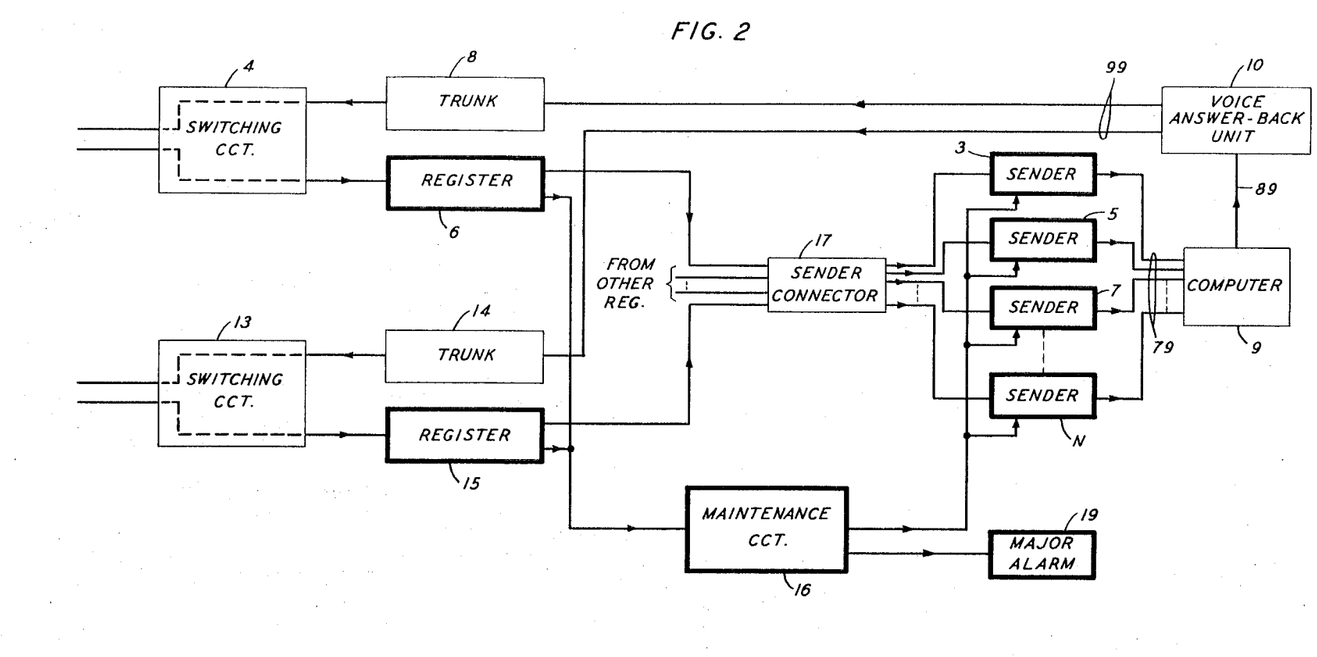

In this regard, an inspection of FIG. 2 will reveal that a register time out could readily result from a malfunction in a register, in a sender, or in a sender connector. It will also be apparent that a trouble condition involving a large number, or perhaps all, of the senders can occur from a failure in any of the cables 79, 89, or 99, or in any of the circuit units interconnected by these cables.

*Detailed description*

In the following description it will be advantageous to refer to certain apparatus disclosed in the Riddell application. For example, reference will be made to relay contacts which are physically controlled from relay windings shown and described in detail in the Riddell application. To simplify the instant drawings, such relay contact designations are enclosed in brackets, for example [50N-8], to indicate that the control circuit for the associated operating winding may be found in the Riddell application.

For purpose of the following description, we shall assume that a subscriber at station S1 has been connected to register 6 (FIGS. 1 and 2) as set forth in the Riddell application. We shall further assume that register 6 has received and registered the stock identifying code and has forwarded this information to sender 3 via sender connector 17.

Figure 3:
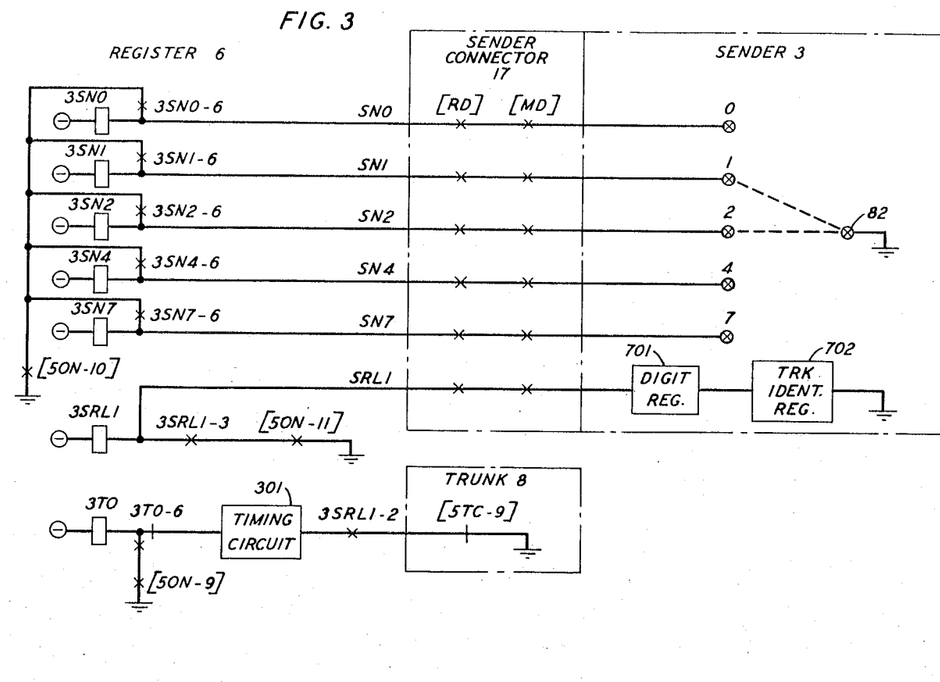
FIGS. 3 through 6 show in greater detail some of the components of the exemplary embodiment.

In the instant arrangement, each sender is assigned an arbitrary numerical designation. For purpose of the embodiment, control circuitry for eight senders (0–7) is shown on the drawings. However, it will be obvious from that which is contained hereinafter, that a greater or lesser number may be provided and also that the senders may be arranged in predetermined groups of two or more. Turning now to FIG. 3, when register 6 is connected to sender 3, ground present on terminal 82 in sender 3 is extended over two of the five leads designated SN0, SN1, SN2, SN4, SN7, so as to cause the operation of the correspondingly designated relays in register 6, thereby providing the register with the identity of the connected sender. Accordingly, in the instant case relays 3SN1 and 3SN2 operate in register 6 and lock operated through their respective make contacts 6 to ground on operated make contact [50N-10]. It should be noted at this time that the sender identity information is received from the sender during the interval that the register is forwarding the called code information to the sender as set forth in the Riddell application.

When the sender has received and registered the called stock code information and the trunk identity information, sender 3 may advantageously be arranged, as well known in the art, to return a ground signal through trunk identity register 702 and digit register 701 via the SRL1 lead so as to operate relay 3SRL1 in register 6. Relay 3SRL1 locks operated by an obvious circuit path to ground on enabled make contact [50N-11]. The operation of relay 3SRL-1 is recognized by the register as a signal that the associated trunk, namely trunk 8, will be enabled as set forth in detail in the Riddell disclosure within a predetermined interval. Accordingly, operated make contact 3SRL1-2 enables timing circuit 301 by extending ground through released break contact [5TC-9] from associated trunk 8. Timing circuit 301 may comprise a number of configurations well known in the art such that, upon the sustained application of a ground signal, a relay operate path will be completed within a predetermined interval. Thus, after a measured time interval relay 3TO will be enabled by timing circuit 301 unless within this interval, break contact [5TC-9] is operated to disable the timing circuit. As set forth in detail in the Riddell application, the operation of relay [5TC] indicates the enabling of associated trunk 8.

For purposes of this description we shall assume that trunk 8 is not enabled within the prescribed interval. Relay 3TO accordingly operates and completes a locking path through enabled transfer contact 3TO-6 and enabled make contact [50N-9] to ground. The enabling of make contact 3TO-4 completes the operate path of slow operate relay 4TMA which extends through make contacts 3TO-4, [6SST-7], 3SRL1-7, [50N-7], and break contact 2 on manually operable nonlocking key AR to ground. Relay 4TMA accordingly operates and locks operated by an obvious circuit extending through the AR key. Register relay 4MB operates at this time by an obvious path to ground through enabled make contact 4TMA-8.

Figure 4:
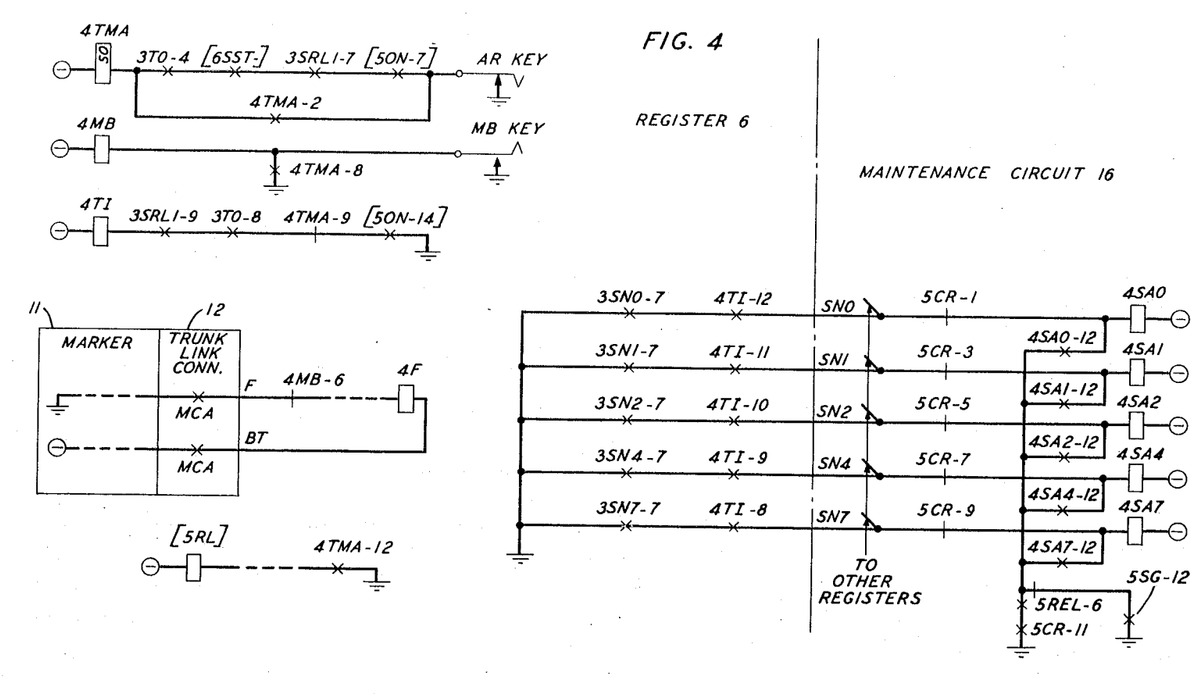

As shown on FIG. 4, the enabling of break contact 4MB-6 disrupts the continuity of the F and BT leads through register 6. The discontinuity of the F and BT leads renders register 6 unavailable for service on subsequent calls as explained in detail beginning in column 27 of Patent No. 2,585,904, issued Feb. 19, 1952, to A. J. Busch. It is, of course, obvious that register 6 may be removed from service in numerous other ways well known in the art.

Summarizing at this point, register 6 has been advised that sender 3 has received the information necessary to complete a call from station S1. Register 6 has thereupon measured a time interval during which the associated trunk 8 should have been enabled had no trouble intervened. The failure of trunk 8 to be enabled within this interval has resulted in register 6 removing itself from service, and as will be apparent from the following will also result in the forwarding of the identity of sender 3 to maintenance circuit 16.

Proceeding now with the description; the operation of relay 3TO enables make contact 3TO-8, thereby completing the obvious operate path of relay 4TI. It should be noted at this point that contacts on relay 3TO concurrently complete the operate paths of relays 4TI and 4TMA and also that the operate path of relay 4TI extends through break contacts 4TMA-9. However, relay 4TI is selected to operate prior to 4TMA and to remain operated during the enabling time of the slow operate 4TMA relay. Thus, previously operated make contacts 3SN1-7 and 3SN2-7 extend ground on the correspondingly designated leads through enabled make contacts 4TI-11 and 4TI-10 so as to provide the identity of sender 3 to maintenance circuit 16. Ground present on the SN1 and SN2 leads to maintenance circuit 16 is extended through break contacts 5CR-3 and 5CR-5 released, so as to cause the operation of relays 4SA1 and 4SA2. The enabling of make contact 4SA1-11 completes the operate path of relay 5SG which extends through 5SG-6 released, 5CR-2 released and 5MXA-11 released to ground. Relay 5SG thereupon locks operated through enabled transfer contact 5SG-6 and released break contact 5REL-7 to ground. Enabled make contact 5SG-12 provides ground through locking contacts 4SA1-12 and 4SA2-12 to maintain the 4SA1 and 4SA2 relays operated. Enabled make contact 5SG-8 extends ground through a two-out-of-five network arrangement of the 4SA– relays to operate relay 5CR at this time. Relay 5CR locks operated through 5CR-2 and 4SA1-11 operated to ground on released break contact 11 of the 5MXA relay. The enabling of relay 5CR is a check that the designation of a sender has been received on a two-out-of-five code basis. The operation of relay 5CR enables correspondingly designated break contacts 5CR-1, 3, 5, 7 and 9, so as to interrupt the continuity of the SN– leads (FIG. 4), thereby preventing seizure of the maintenance circuit by another register at this time.

Figure 5:
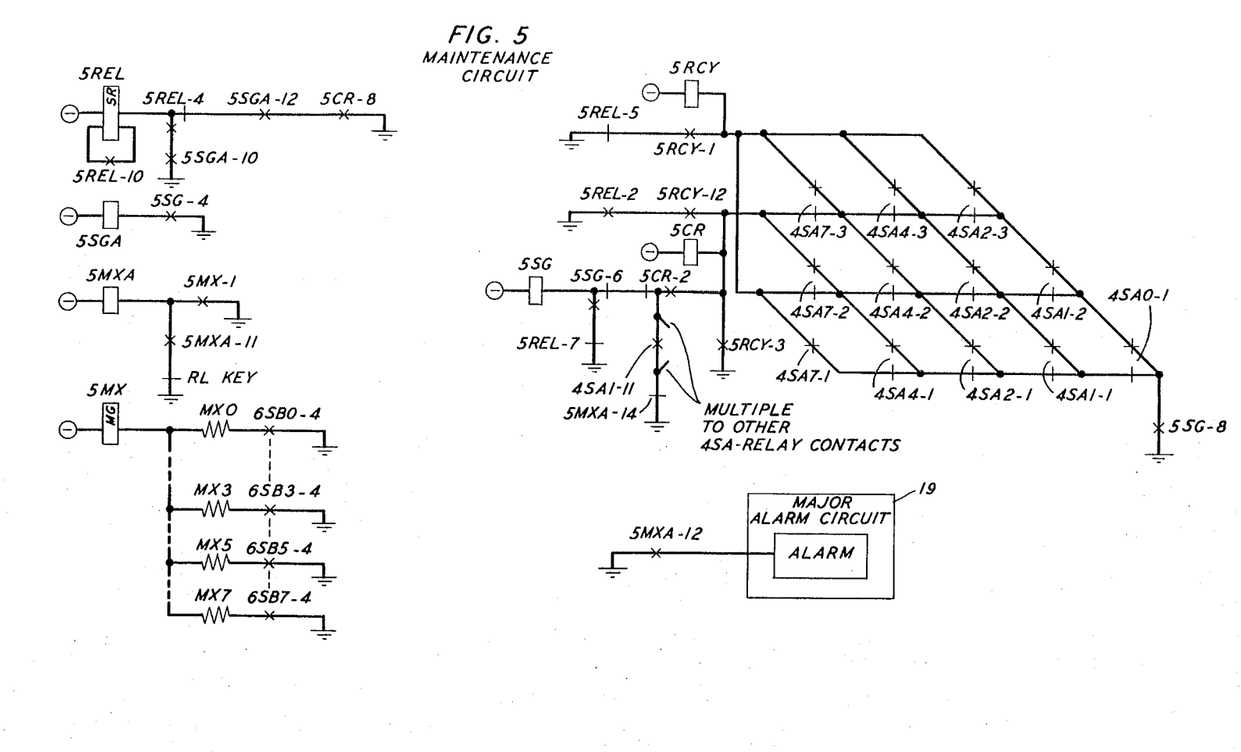

Referring momentarily to FIG. 5, in the event that two registers were to simultaneously seize the maintenance circuit, more than two SA– relays would of course be operated. Referring specifically to the two-out-of-five network arrangement of the SA– relays, it will be noted that for a condition of these relays other than two-out-of-five, relay 5RCY will be enabled. The operation of relay 5RCY removes ground from the 5CR-4 contact (FIG. 6) so as to inhibit registration of any sender identity, as will be more apparent hereinafter. Enabled make contact 5RCY-3 operates relay 5CR by an obvious circuit path. As disclosed in detail hereinafter, the operation of relay 5CR causes the restoration to normal of maintenance circuit 16. Therefore, in the event of simultaneous seizure by two registers, maintenance circuit 16 is arranged to recognize this condition and to cause a suspension of the normal function of the maintenance circuit.

Figure 6:
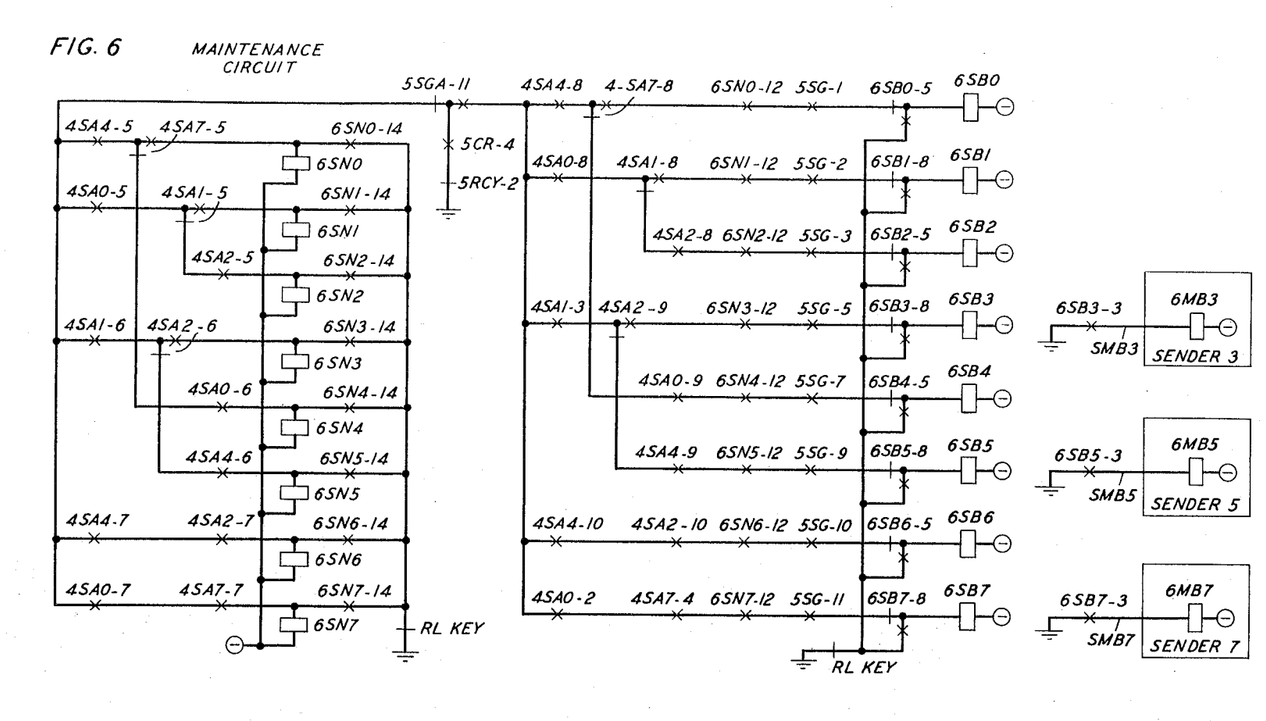

Enabled make contact 5SG-4 completes the operate path of relay 5SGA by an obvious circuit. Referring now to FIG. 6, the enabling of transfer contact 5SGA-11 provides a ground through released break contact 5RCY-2 and operated make contact 5CR-4 to an array of make contacts on the 4SA– relays which translate the two-out-of-five designation received from the register into a one-out-of-eight designation. Each one-out-of-eight designation is applied to a correspondingly designated make contact 12 on the 6SN– relay. Assuming at this point that sender 3 has not been involved in a prior trouble condition, relay SN3 is in a released state. Thus, the ground through 5SGA-11 is not extended so as to perform any function at this time.

The operation of relay 5SGA enables make contact 5SGA-12 so as to extend ground from enabled make contact 5CR-8 through the upper winding of the 5REL relay. The operation of relay 5REL enables break contact 5REL-7 to cause the release of relay 5SG. The release of relay 5SG causes the release of relay 5SGA by an obvious circuit which thereupon starts the release of the slow release 5REL relay. The release of transfer contact 5SGA-11 extends ground present on break contact 5RCY-2 to an array of make contacts on the 4SA– relays so as to cause the operation of relay 6SN3 at this time through enabled make contacts 4SA1–6 and 4SA2–6. Relay 6SN3 enables make contact 6SN3–14 which completes a locking path extending through the RL key to ground.

Upon release of the 5REL relay, the locking ground for the 4SA– relays which previously extended through the 5REL–6 transfer contact is removed. Accordingly, the operated relays 4SA1 and 4SA2 release, thereby opening the previously described locking path of relay 5CR causing the release of that relay. The maintenance circuit at this point has thus restored to normal, and has locked in its memory (via the operated 6SN3 relay) the identity of the sender involved on the trouble connection.

We shall assume at this point that a subsequent connection involving register 15 and sender 3 results in the repetition of that which has been described hereinbefore. Thus, register 15 has timed a measured interval during which the associated trunk 14 was not enabled. Register 15 thereupon removed itself from service and forwarded the identity of sender 3 to maintenance circuit 16 in the same fashion as previously described for register 6.

At this time relays 4SA1 and 4SA2 reoperate as previously described. The sequence of relay operations in maintenance circuit 16 proceeds as hereinbefore described to the point where enabled transfer contact 5SGA–11 (FIG. 6) extends ground to a network of make contacts on the 4SA– relays. However, make contact 6SN3–12 is enabled at this time; thus the ground extended through 5SLA–11 is further extended through enabled make contacts 4SA1–3 and 4SA2–9, the operated 6SN3–12 make contact, through 5SG5, 6SB3–8 released, so as to operate relay 6SB3 at this time. Relay 6SB3 accordingly locks operated through an obvious circuit path extending to ground through the RL key. The enabling of make contact 6SB3–3 extends ground from maintenance circuit 16 over the SMB3 lead so as to cause the operation of relay 6MB3 in sender 3. The operation of relay 6MB3 causes the removal of sender 3 from service employing techniques well known in the art which may be similar to that hereinbefore described for register 6.

Referring momentarily to FIG. 2, we shall further assume that in similar fashion as hereinbefore described for sender 3, senders 5 and 7 are each successively removed from service. Accordingly, at this time relays 6SB3, 6SB5, and 6SB7 are operated in maintenance circuit 16.

Referring now to FIG. 5, make contacts 6SB3–4, 6SB5–4, and 6SB7–4 are in an operated condition indicating that the aforesaid senders have been removed from service. Marginal relay 5MX has been selected to operate in response to the connection of three MX– resistances in parallel in the 5MX relay operate path. Accordingly, relay 5MX operates at this time. Relay 5MX in operating enables make contact 5MX–1, thereby operating relay 5MXA which locks operated by an obvious circuit through the RL key to ground. Enabled break contact 5MXA–14 removes the operating ground from the 5SG relay operate path. Therefore, subsequent operations of 4SA– relays, as hereinbefore described, are of no effect on maintenance circuit 16. Concurrent therewith operated make contact 5MXA–12 extends ground from maintenance circuit 16 to major alarm circuit 19 so as to alert maintenance personnel that three senders have been removed from service, each because of repeated involvement in a trouble connection, and that, apparently, a trouble external and common to the senders is at fault.

While the equipment of this invention has been described with reference to a particular embodiment in a telephone stock quotation system, it is to be understood that such an embodiment is intended merely to be illustrative, and that numerous other arrangements may be devised by those skilled in the art without departing from the spirit and scope of the invention.

For example, the invention may be employed in conventional switching systems designed to interconnect telephone subscribers or data processing machines.

What is claimed is:
1. In an automatic switching system,
a plurality of operating circuits,
means for successively removing certain of said operating circuits from service in response to a plurality of trouble indications from each of said certain circuits, and
means for inhibiting removal from service of additional operating circuits upon the removal of a predetermined number of said certain circuits.

2. In an automatic switching system,
a plurality of operating circuits,
a plurality of connecting circuits each operative to transmit the identity of an associated operating circuit,
a maintenance circuit comprising means responsive to the repeated reception of the identity of any one of said operating circuits for inhibiting subsequent functioning of said identified operating circuit, and
means responsive to the inhibiting of a predetermined number of said operating circuits within a predetermined interval for disabling said inhibiting means.

3. In an automatic switching system,
a plurality of operating circuits,
means for detecting the apparent existence of a trouble in each of said operating circuits,
a maintenance circuit,
means activated by said detecting means responsive to a trouble detection for indicating the associated operating circuit identity to said maintenance circuit,
said maintenance circuit comprising means for determining if said indicated identity is a first indication for the associated operating circuit,
memory means for storing said first indications, and
means activated by said memory means and responsive to receipt in said maintenance circuit of a subsequent indication for disabling said associated operating circuit.

4. In an automatic switching system,
the combination set forth in claim 3 wherein said maintenance circuit further comprises means responsive to the enabling of said disabling means a predetermined number of times for inhibiting said disabling means.

5. In an automatic switching system,
the combination set forth in claim 3 wherein said detecting means comprises a timing circuit operative to measure the interval of time required for each of said operating circuits to complete its function.

6. In a telephone system,
a plurality of registers,
a plurality of senders,
means for connecting any register to any sender,
a memory,
trouble detection means responsive to the connection of a register to a malfunctioning sender for indicating to said memory the designation of said malfunctioning sender,
said memory comprising means responsive to receipt of the designation of said malfunctioning sender a predetermined number of times for inhibiting subsequent connection of said malfunctioning sender to any register, and
means responsive to the operation of said inhibiting means a predetermined number of times for disabling said inhibiting means.

7. In a telephone system,
the combination set forth in claim 6 wherein each of said registers comprises means responsive to the connection to a sender for registering the connected sender designation.

8. In a telephone system,
the combination set forth in claim 6 wherein each of said registers further comprises means operative in response to the enabling of said trouble detection means for inhibiting subsequent connection of said connected register to any sender.

9. In a telephone switching system,
a plurality of senders each assigned a distinct designation and each comprising disabling means operative to remove the corresponding sender from service,
a plurality of registers,
means for connecting any register to any sender,
first means for temporarily storing a sender designation received from a register,
second means enabled by said first means for permanently storing a plurality of sender designations,
means operative after the enabling of said second means for erasing the sender designation stored in said first means,
inhibiting means operative in response to the storage of a sender designation in said first means identical to a designation previously stored in said second means for enabling the corresponding sender disabling means, and
means for rendering said inhibiting means inoperative in response to the enabling of said inhibiting means a predetermined number of times.

10. In a telephone switching system,
an alarm circuit,
a plurality of operating circuits,
means for removing an operating circuit from service only after a trouble indication has been confirmed by a subsequent trouble indication, and
means responsive to the removal of a predetermined number of said operating circuits for inhibiting said removing means and for thereupon enabling said alarm circuit.

No references cited.

KATHLEEN H. CLAFFY, *Primary Examiner.*

R. MURRAY, *Assistant Examiner.*